W. K. Leach,
Truss Pad.
Nº 42,298.      Patented Apr. 12, 1864.
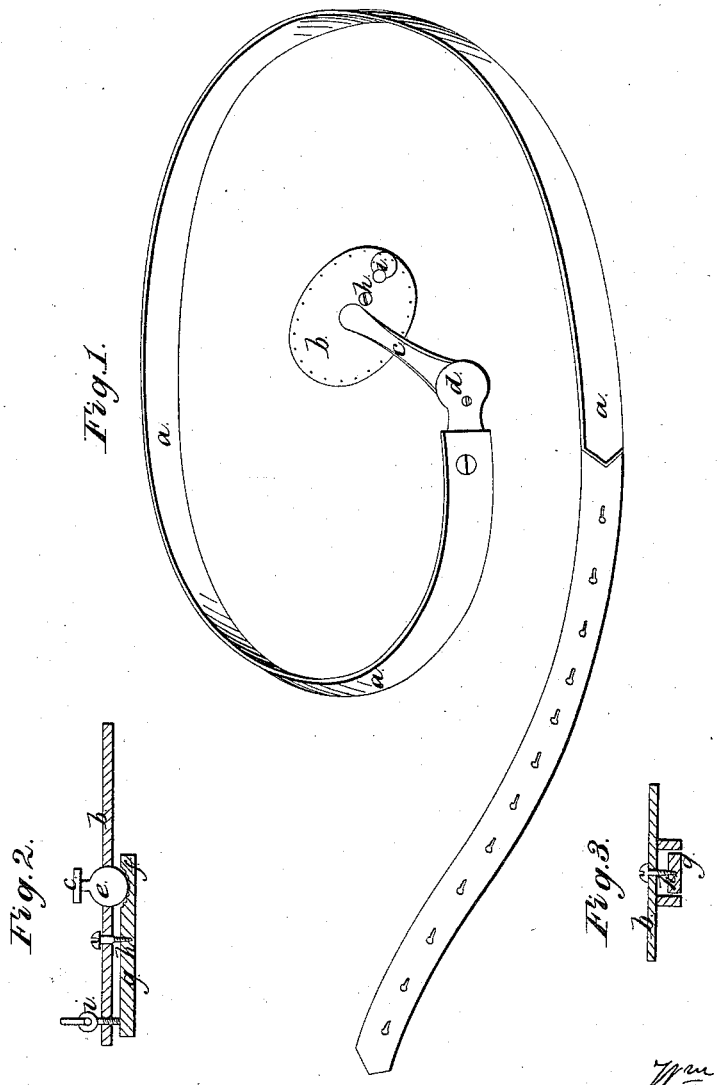
Witnesses.
Albert W. Brown
Frederic A. Sayer
Inventor.
Wm K. Leach
by his
Att'y
Joseph Gavett

UNITED STATES PATENT OFFICE.

WILLIAM K. LEACH, OF BOSTON, MASSACHUSETTS.

IMPROVEMENT IN TRUSS-PADS.

Specification forming part of Letters Patent No. 42,298, dated April 12, 1864.

*To all whom it may concern:*

Be it known that I, WILLIAM K. LEACH, of Boston, in the county of Suffolk and State of Massachusetts, have invented certain new and useful Improvements in the Mode of Fastening Truss-Pads; and I do hereby declare that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plate of drawings represent my improvements.

Figure 1 is a perspective view of a truss with my improvements applied thereto. Fig. 2 is a longitudinal vertical section across the truss pad. Fig. 3 is a transverse vertical section of the same.

The object of the present improvement is to afford more certain means for fastening and holding a truss-pad in whatever position it may be set. Heretofore it has been fastened by various arrangements of devices in such a manner as to have its inclination varied at pleasure, and especially by means of a lever acting upon a universal or ball-and-socket joint, so as to bind the ball and its socket together; but in this case the mode of fastening is not secure on account of the slipping of the smooth surface of the ball upon that of the socket. This difficulty is overcome in my improvement by checking, scoring, or otherwise roughening the surface of the socket or the ball or both, so that when the ball and socket are forced by a lever-pressure together they cannot slip or be displaced without first relieving the lever-pressure.

$a\ a\ a$ in the drawings represent the belt of a truss having the usual steel spring therein to cause it to clasp the body. $b$ is the pad-plate attached to an arm, $c$, that is fastened at one end to a plate, $d$. The other end of the arm $c$ is fastened to a ball, $e$, that plays in a socket, $f$, of a lever-bar, $g$. This socket has its surface scored or roughened, as shown in Fig. 2. The lever-bar $g$ turns upon a fulcrum at $h$, and is actuated by a screw, $i$, that bears upon the end of the lever-bar $g$ most remote from the ball-and socket joint. By raising or depressing the spring $i$ it will be seen that the socket $f$ will be relieved from or forced against the ball $e$. When the socket $f$ is forced upward against the ball $e$, its roughened surface will bind and hold upon the periphery of the ball $e$ and prevent its slipping therein, and thus securely fasten the pad-plate in whatever position or at whatever angle the latter may be placed. It will be evident that the same effect may be produced by scoring or roughening the periphery of the ball $e$, or that both the surface of the ball and that of the socket may be scored or roughened to prevent the slipping of one upon the other.

What I claim as my invention, and desire to have secured to me by Letters Patent, is—

The fastening for a truss-pad hereinabove described, the same consisting of a ball-and-socket joint actuated by a lever-bar, and having the surface of the socket or of the ball or both scored or roughened as set forth.

WM. K. LEACH.

Witnesses:
JOSEPH GAVETT,
ALBERT W. BROWN.